3,684,448
APPARATUS AND PROCESS OF IN VITRO DE-
TERMINATION OF THE DISSOLUTION BEHAV-
IOR OF DRUGS OR PHARMACEUTICAL COM-
POSITIONS CONTAINING THE SAME IN THE
GASTROINTESTINAL TRACT
Herbert Stricker, Ingelheim am Rhine, Germany, as-
signor to Boehringer Ingelheim G.m.b.H., Ingelheim
am Rhine, Germany
Filed June 26, 1970, Ser. No. 50,018
Claims priority, application Germany, June 30, 1969,
P 19 33 118.1
Int. Cl. B01d 11/04; G01n 33/16
U.S. Cl. 23—230 B     4 Claims

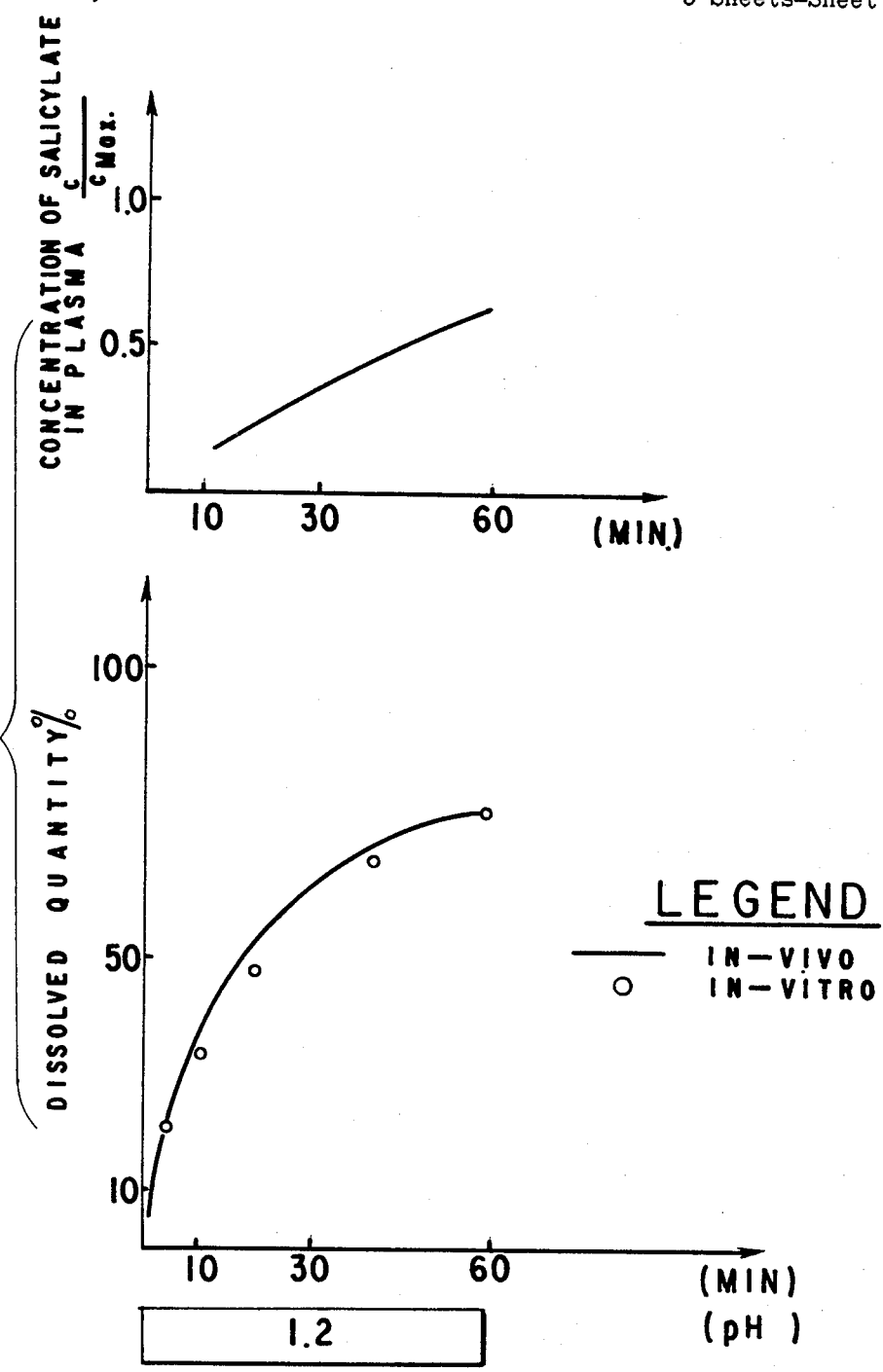

ABSTRACT OF THE DISCLOSURE

An apparatus for in vitro determination of the dissolu-
tion behavior of pharmaceutical compositions in the gas-
trointestinal tract comprising a thermostatically con-
trolled, cylinder mounted for horizontal rotation about its
cylindrical axis approximately 50% filled with solid
spheres, supply means for artificial stomach fluid and
gastric fluid, respectively, connected to said cylinder, me-
tering means and fraction collector connected in series to
a discharge outlet of the cylinder and time sequence con-
trol means for actuating the metering means and fraction
collector and process of using said apparatus.

BACKGROUND AND OBJECTS OF THE INVENTION

Figure 1:
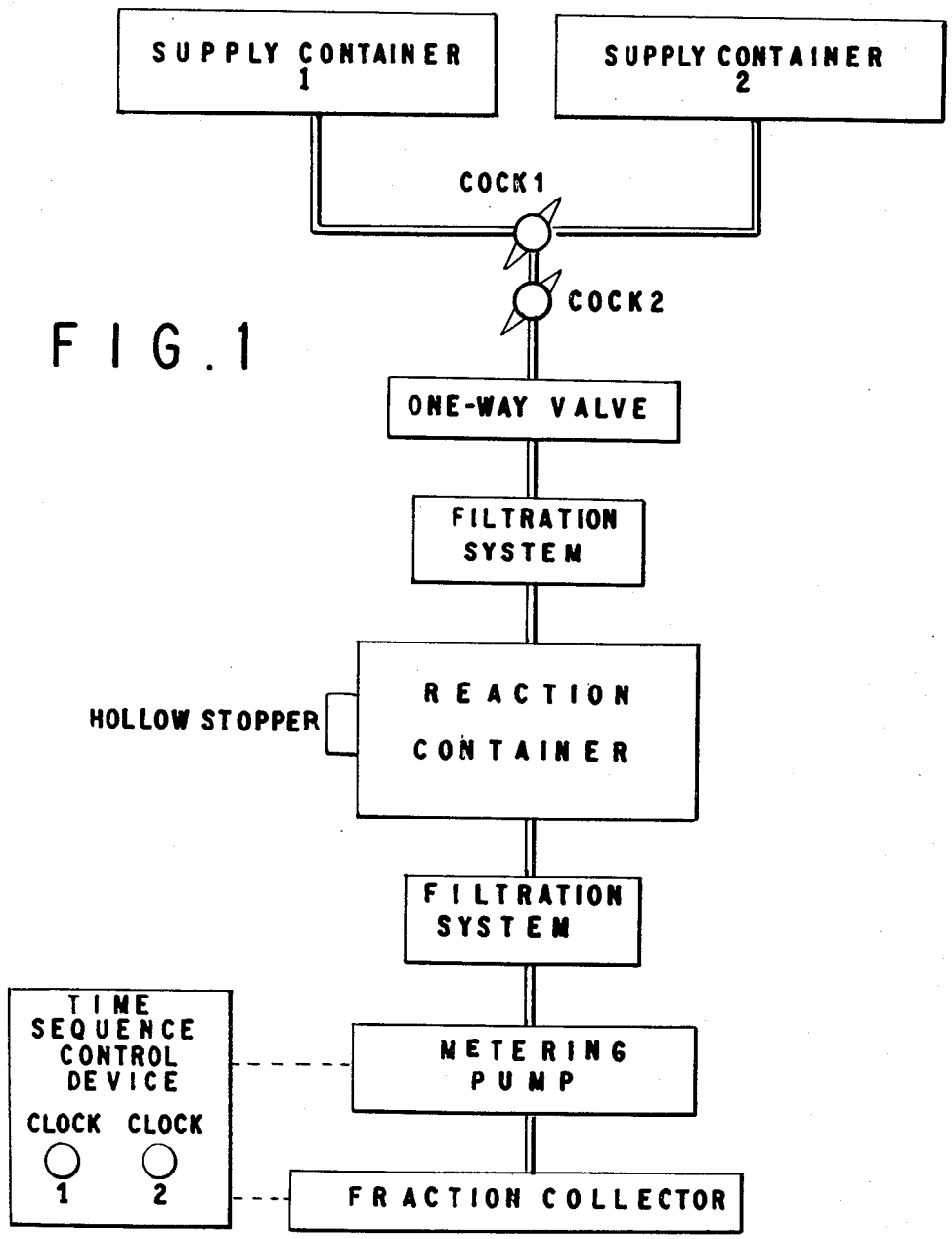

It is normally expected that an orally administerable
pharmaceutical composition, such as tablets, sugar-coated
tablets, granulates, capsules or suspensions, the ingredients
of which are solid, should dissolve in the gastrointestinal
tract as completely and as quickly as possible. Sustained
release compositions, i.e. those whose active ingredient is
to dissolve only gradually and within a predetermined
period of time, are considered as exceptions. The course
of dissolution is essentially predicated upon the following
factors in the gastrointestinal tract:

(1) body temperature,
(2) mechanical forces,
(3) quantity of the available digestive fluids (stomach
fluid, intestinal fluid),
(4) the average residence time of the particular com-
pound in the individual segments of the gastrointestinal
tract, or the pH-gradient in relation to time, and
(5) elimination of the active ingredient from the gastro-
intestinal tract, based on its absorption.

Of these, the body temperature is the only value which is
exactly known and normally remains stable. The mechani-
cal forces in the gastrointestinal tract—caused by the peri-
stalsis—however, are neither exactly known as to their
degree nor as to their timely function. As far as the prop-
erties and nature of the individual gastrointestinal liquids
are concerned, the following may be summarized: The
stomach and intestinal fluids of an adult contain essentially
the following substances in dissolved form:

Stomach fluid (50–100 ml.): 0.2% of proteins, 0.1% of
mucins and hexoses, 0.4% of inorganic salts
Intestinal fluid (40–80 ml.): 0.8% of proteins and 1.2%
of inorganic salts.

The enzymes present in the stomach and intestinal fluids
are referred to merely in passing; it is known that they
only rarely influence the dissolution of pharmaceuticals.

As to the physical-chemical properties of the gastroin-
testinal liquids, such as viscosity, surface tension and pH-
value, the literature discloses the following information:

Human gastric fluid has an average viscosity of 1.06
cp. and a surface tension of 35–50 dynes/cm. No infor-
mation is given, however, as to whether viscosity and sur-
face tension, within the physiological orders of magnitude,
influence the dissolution of pharmaceuticals. The pH-value
of the gastrointestinal fluids depends more or less upon
the degree to which the stomach and intestines are filled
therewith. After ingestion of relatively small quantities of
light food, it is normally within the ranges of 1.2 to 1.8
(stomach), 4.7–6.5 (duodenum) and 6.2–7.3 (remaining
intestinal tract). Since it is known that orally administered
pharmacodynamic agents generally advance further into
the gastrointestinal tract, the change of pH-value in rela-
tion to time to which an orally administered pharmaceuti-
cal is subjected must be taken into consideration. The pe-
riods of time over which various foods remain in the gas-
trointestinal tract may vary greatly. Excluding extreme
cases, the following average residence periods apply:

approximately 1 hour in the stomach;
approximately 4 to 5 hours in the small intestine;
and 4 to 20 hours more in the remaining intestinal tract.

As already mentioned, absorption is also a factor which
may influence the dissolution process. This applies particu-
larly to those instances where the absorption of the phar-
macodynamic agent proceeds more rapidly than its dis-
solution; but it also applies to those instances where the
rates of absorption and dissolution are of about the same
order of magnitude. Their mutual influence may remain
unconsidered only if the dissolution rate of the pharma-
codynamic agent is much greater than its absorption rate.

On the one hand, the dissolution properties of a phar-
maceutical may be considered in connection with the
physiological conditions existing in the gastrointestinal
tract. On the other hand, the specific physical properties
of the pharmacodynamic agent and the pharmaceutical
composition containing it must be taken into considera-
tion. Thus, besides the absorption rate and the solubility
of the pharmaceutical within the gastrointestinal fluids,
the factor of the particle size and the outer surface area,
as well as the disintegration rate of the pharmaceutical
composition must be considered in this connection. Ex-
perience has shown that the disintegration into agglom-
erated individual particles does not follow simple rules,
which is understandable if the different factors are con-
sidered which influence the disintegration of a pharma-
ceutical composition, such as its composition, technologi-
cal factors in its manufacture, and the like.

Since it is, of course, very difficult to make a direct
observation of the course of dissolution in vivo, it was
highly desirable to develop an apparatus and a process
with which the dissolution rate of a pharmaceutical could
be measured in vitro, because a substantial simplification
of the working conditions and a greater precision of the
results would be derived therefrom. Such a process must,
obviously, furnish results which are as close as possible
to the results obtained from an in vivo determination, i.e.
it has to be calibrated to in vivo results. Since a direct,
satisfactorily functioning method for in-vivo-determina-
tion of the dissolving properties of pharmaceuticals is not
known at this time, it was necessary, in order to calibrate
the in vitro method according to the invention, to evaluate
the results of in vivo tests in which, after oral adminis-
tration of solid pharmaceutical preparations, the effective
action or the concentration of the pharmacodynamic
in the plasma was determined. From the chronological
development of the effective action or the concentration
in the plasma, it is possible to calculate the dissolution
in relation to time of pharmaceuticals in the gastrointes-
tinal tract, based on known pharmacokinetic laws [see,
for example, Dost, "Grundlagen der Pharmakokinetik,"

2nd Ed., Georg-Thieme-Verlag, Stuttgart, Germany (1968)].

The apparatus of the invention consists essentially of a thermostatically controlled, cylindrical container mounted for horizontal rotation about its cyclindrical axis, said container being filled to about 50% of its volume with solid spheres, preferably glass spheres; an opening in one end of said container, said opening being closed by a hollow stopper; two thermostatically controlled supply containers for storage of artificial stomach and gastric fluid, respectively, connected to said cylindrical container through a common inlet feed tube; a metering pump and a fraction collector connected in series to a discharge outlet in said cylindrical container; and a time sequence control device connected to said metering pump and fraction collector for actuating the same at predetermined time intervals.

The process comprises, while thermostatically maintaining the temperature of the cylindrical container about half filled with spheres at 37° C. and rotating said cylindrical container about its horizontal cylindrical axis at about 0.6 to 1.2 r.p.m., (a) Charging into the rotating cylindrical container the pharmaceutical composition whose dissolution behavior is to be determined as well as artificial stomach fluid in a volumetric ratio of about 45:55 in relation to the volume of said spheres, (b) Actuating the metering pump by means of the time sequence control device, set for $t_2$=about 0.3 minutes and according to the equation $$t_1 = \frac{V_D}{V_s \cdot K_I} - t_2$$

wherein $t_1$ and $t_2$ are the time intervals in minutes of the two control clocks of the time sequence control device, V is the volume of sample to be withdrawn in ml. and $K_I$ is the resorption rate constant of the pharmaceutical to be tested referred to the place of resorption, to withdraw from the cylindrical container at time intervals $t_1$ and $t_2$ a sample of liquid corresponding to volume V (the cylindrical container having been first fed with V ml. of artificial stomach fluid, and then after one hour of running time and neutralization, with artificial intestinal fluid), (c) Collecting the withdrawn samples in the fraction collector, which is also controlled by the time sequence control device, determining the concentration of the active ingredient of the pharmaceutical in said samples in the conventional way, and determining the rate of dissolution of the active ingredient in the pharmaceutical composition pursuant to the equation $$A_x = V_s \cdot C_x + V_D \cdot \sum_{i=1}^{i=x-1} C_i$$

wherein $A_x$ represents the dissolved quantity of active ingredient at the time of the xth metering of a sample (in mgm.)

$V_s$ is the volume of the liquid phase in the cylindrical container (in ml.)

$C_x$ is the measured concentration of the active ingredient in the xth sample, and $V_D$ is the metering volume of the metering pump (=2V; sum of preliminary and main fraction).

The invention also relates to a process for in vitro testing of the in vivo dissolving properties of pharmaceuticals in the gastrointestinal tract, as well as to an apparatus for the performance of this process. In this apparatus all types of pharmaceutical preparations with a solid active ingredient, i.e. tablets, sugar-coated tablets, suspensions, hard and soft gelatin capsules, or the like, may be accurately tested.

THE INVENTION

Figure 2:
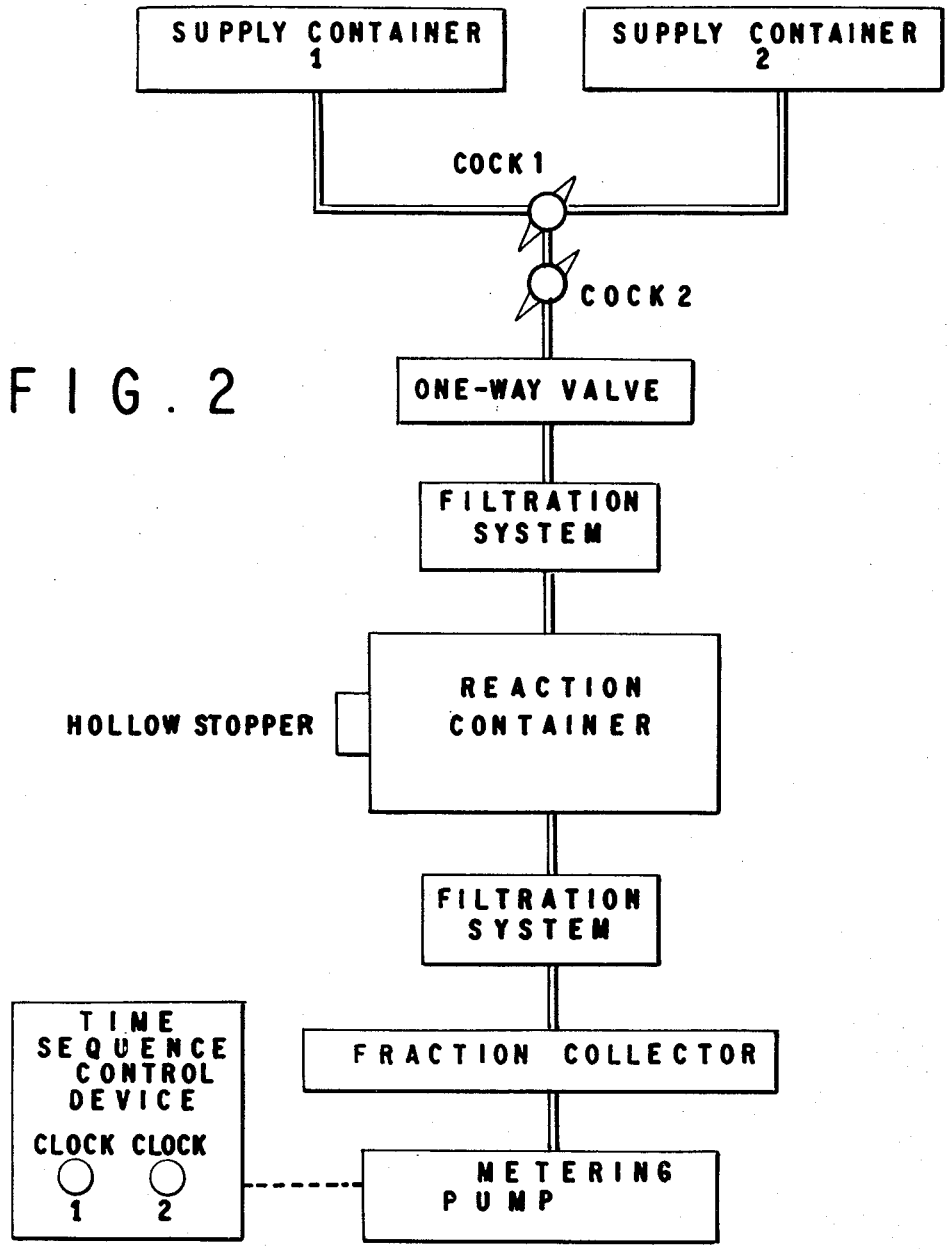

FIGS. 1 and 2 of the accompanying drawings are schematic representations of the apparatus according to the present invention, and the individual elements thereof as well as their functions are described in greater detail below. The dimensions and other numerical data recited in connection with this description are those which duplicate most closely the conditions in the gastrointestinal tract; it should be understood, however, that these dimensions and data are merely illustrative and by no means critical.

As essential element of construction, the apparatus according to the invention comprises a cylindrical container mounted for rotation about its horizontal cylindrical axis, which represents the gastrointestinal tract. The height and diameter of the cylinder measure, for instance, 5 cms. each. In this case the system, including the cylindrical container and the filtration systems (which are explained more closely below), has a capacity of 150 ml. 70 ml. (i.e. about 45% of this volume) are occupied by 180 gm. of glass balls having a diameter of 0.8 cm. which are charged into the cylindrical container, and the remaining 80 ml. (about 55%) are occupied by artificial stomach or intestinal fluid. The cylindrical container is thermostatically maintained at 37° C. by means of a liquid in an exterior jacket (not shown) and has an opening in one end which is closed by a hollow stopper made, for instance, of chlorosulfonated polyethylene. In the two plane areas opposite to one another, an inlet and an outlet opening are provided. The inlet opening is connected by a common conduit to two thermostatically heated supply vessels, one of which holds artificial stomach fluid, and the other artificial intestinal fluid. From these supply vessels, the inlet conduit goes through a one-way valve and then through a filtration system (explained below) and leads into the cylindrical reaction container. The conduit connected to the outlet opening goes first through another filtration system, then through a metering pump with a constant metering volume (in the present example 4 ml.), and then into a fraction collector, where the withdrawn liquids are collected. The metering pump serves for the withdrawal of samples from the cylindrical reaction container, as well as for fresh artificial digestion fluids from the supply vessels into the cylindrical reaction container.

The metering pump and fraction collector are electrically actuated by impulses from a conventional time sequence control device including two timing clocks set for certain time intervals. How these timing clocks are set is explained further below.

Each of the filtration systems consists of G-3 glass filter frits, where the outlet filtration system—considering the very different filtrability of active ingredient solutions obtained from pharmaceutical compositions—may be preceded by a glass-fiber preliminary filter, optionally in combination with glass wool.

In case of very difficultly filtrable solutions, it is advantageous to use a system which alternates intake and outlet by means of a magnetically actuated double three-way cock.

With certain pharmaceuticals it is possible not to consider the absorption rate at all, namely, in case the dissolution rate is much greater than the absorption rate. In these cases a simplified apparatus may be used, wherein the fraction collector is inserted immediately behind the outlet filtration system (see FIG. 2). With this modification, however, the filtration system with the alternating inlet and outlet means cannot be used.

In order to obtain results which are as exact as possible, the peristalsis of the gastrointestinal tract must be duplicated in a suitable manner. With the apparatus according to the invention the peristalsis is simulated by means of the following details.

(1) The cylindrical reaction container is rotated at a constant rotation speed of approximately 0.6–1.2 rotations per minute, preferably 0.9 to 1.2 r.p.m.

(2) The use of balls of the indicated size and quantity (diameter about 0.8 cm., occupying about half of the volume of the reaction container), possessing the density and hardness of normal glass. It is the simplest to use glass balls.

As previously indicated, a sharp increase in the pH takes place in the organism after passage through the pylorus. This pH-pump is simulated on the apparatus according to the invention in the following way:

First, the cylindrical reaction container is fed with artificial stomach fluid having a pH-value of 1.0–1.3, which is prepared from the following ingredients:

110.0 ml. of aqueous 1 N HCl
6.6 gm. of $H_3PO_4$ (100%) q.s.ad 1000.0 ml. of distilled water.

After one hour of running time, the cylindrical reaction container is charged through the lateral hollow stopper with 4.0 ml. (5% of the already present quantity of liquid) or, in case of the simplified model (FIG. 2), with 3.8 ml. of neutralization solution (consisting of 4.0 N aqueous NaOH). In the further course of the test, the volume of the samples taken from the cylindrical reaction container is replaced by artificial intestinal fluid (pH 6.5) compounded from the following ingredients:

105.0 ml. of aqueous 1 N HCl
50.0 ml. of aqueous 4.05 N NaOH
6.26 gm. of $H_3PO_4$ (100%) q.s.ad 1000.0 ml. of distilled water.

In order to achieve a functioning of the apparatus corresponding to actual physiological conditions, a simulation of the absorption factor is required for most of the pharmaceuticals (i.e. for all those whose absorption rate is not much slower than its dissolution rate). As a limiting value, beginning with which the effect of the absorption of the pharmaceutical upon the dissolution gains significance, an absorption quota of 20% per dose at the time of 90% dissolution of the pharmaceutical $t_L$ (measured in minutes) may be assumed pursuant to the following equation:

(Equation 1) $\quad K_I \cdot t_L = 0.2$ wherein $K_I$ represents the absorption rate constant[min.$^{-1}$] of the specific pharmaceutical with reference to the locus of absorption, which is either known or must be determined beforehand (in kinetically exact terms, $K_I$ is the product of rate constant and the available stomach or intestinal wall surface area).

The absorption procedure is simulated in the apparatus according to the invention in the following way:

At pre-selected time intervals, the time-sequence control device emits two electrical impulses, one following shortly after the other; the first initiates the transport of the so-called preliminary run, the second the transport of an analysis sample. The transport is performed by the metering pump, which withdraws from the cylindrical reaction container per impulse 4.0 ml. of solution (i.e. 5% of the quantity of liquid present) via the outlet filtration system. This metered volume (V) must be kept as constant as possible; it corresponds to the volume of the outlet conduit between the reaction container and fraction collector. This volume remaining in the conduit, perhaps for some time between two meterings, is not suitable for analytical determination of the chronological change of concentration and must therefore be discarded.

Timing clock 2 of the time-sequence control device should normally be set for a time ($t_2$) of 0.3 minutes; the time setting of timing clock 1 ($t_1$), however, is a function of the absorption rate of the particular pharmaceutical. $t_1$ is calculated in accordance with Equation 2, which is based on a withdrawal of 10% of the dissolved pharmaceutical from the cylindrical reaction container with each impulse.

(Equation 2) $\quad t_1 = \dfrac{V_D}{V_S \cdot K_I} = t_2$ i.e. for the particular embodiment:

$$t_1 = \dfrac{1}{10 \cdot K_I} - 0.3 \text{ [min.]}$$

The maximum number of analysis samples (X) resulting from the constancy of values $t_1$ and V as well as from the specific absorption rate of the pharmaceutical is calculated pursuant to the following equation:

(Equation 3) $\quad X = 10 \cdot t_L \cdot K_I$

The relationship of the time-sequence of the sample-transport to the value $K_I$ is illustrated in the following table:

| KI, min. | Samples (each 4 ml.) | | |
|---|---|---|---|
| | $t_1$, min. | $t_2$, min. | Sequence, min. |
| $30 \cdot 10^{-3}$ | 1.7 | 0.3 | 2, 4, 6, . . . |
| $10 \cdot 10^{-3}$ | 9.7 | 0.3 | 10, 20, 30, . . . |
| $5 \cdot 10^{-3}$ | 19.7 | 0.3 | 20, 40, 60, . . . |
| $0.83 \cdot 10^{-3}$ | 119.7 | 0.3 | 120, 240, . . . |

If the value of the product of $K_I \cdot t_L$ is below 0.2, the influence of the absorption upon the dissolution rate may practically be neglected, so that the simplified apparatus with a manually-operated, smaller fraction collector (FIG. 2) may be used.

For a test run the apparatus is prepared as follows:

After the cylindrical reaction container as well as the two supply vessels have been thermostatically brought to a temperature of 37° C. and the supply vessels have been filled with artificial stomach and intestinal fluids, respectively, the cylindrical reaction container is charged with the glass balls and with the pharmaceutical preparation to be tested. The outlet opening of the reaction container is directed upwardly and is closed by the inlet filtration system. Then, the reaction container is filled with artificial stomach fluid by means of the metering pump and the time-sequence control device, by setting both of the timing clocks for a very short time (about 5 sec.) and opening cock 2. As soon as the reaction container has been filled, the times $t_1$ and $t_2$ are set on the timing clocks 1 and 2, where $t_1$ has to be calculated according to Equation 2. The actual test starts at the time when the cylindrical container is completely filled and its rotation has been started. If the test run lasts longer than 60 minutes, the rotation is briefly interrupted; during that time cock 2 is closed, while the point of time between transport of the intake and withdrawal of the sample must be allowed to pass. Then, while the sample is being transported, there is added through the hollow stopper (instead of the 5% of intake) a corresponding quantity of the above-mentioned neutralizing solution. By adjusting cocks 1 and 2 correspondingly, the artificial intestinal fluid from supply vessel 2 is allowed to run in, and the rotation of the cylindrical container is resumed again.

The concentration of active ingredient in the individual fractions collected in the fraction collector is subsequently determined in conventional fashion, for instance, photometrically or titrimetrically. From these values the quantity of active ingredient dissolved at a certain period of time is calculated according to the following equation:

(Equation 4)

$$A_x = V_s \cdot C_x + V_D \cdot \sum_{i=1}^{i=x-1} C_i$$

wherein $A_x$ = the quantity of active ingredient dissolved in the reaction container (simulated gastrointestinal tract) at the time of the $x$th sample removal (in mgm.)

$V_s$ = the known volume of the liquid phase in the reaction container (in ml.); in the case of the illustrative apparatus described herein: 80 ml.

$C_x$ = the concentration (photometrically or titrimetrically determined) of the dissolved pharmaceutical (in mgm./ml.) in the $x$th sample $V_D$ = the known metered volume of the metering pump (sum of preliminary run and analysis sample).

Figure 3:
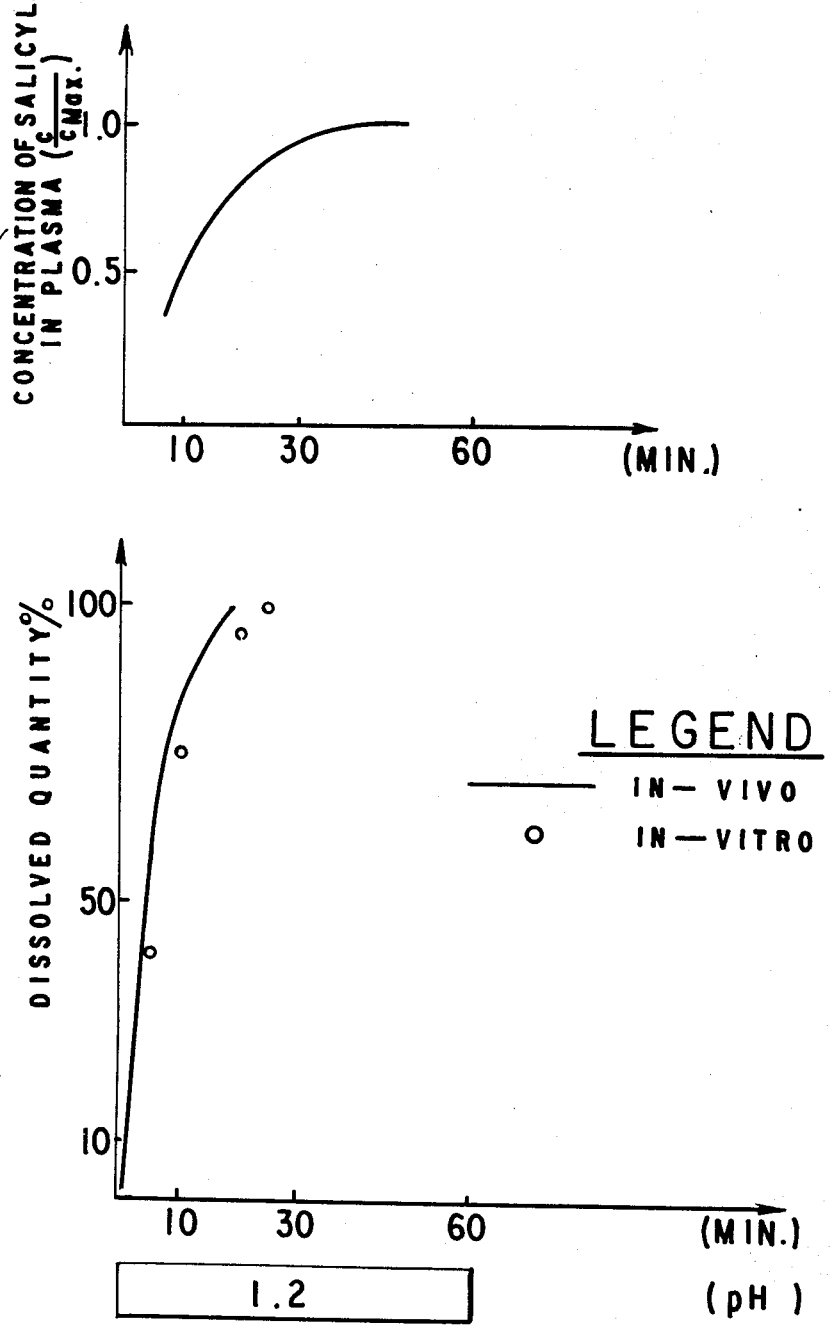
Figure 4:
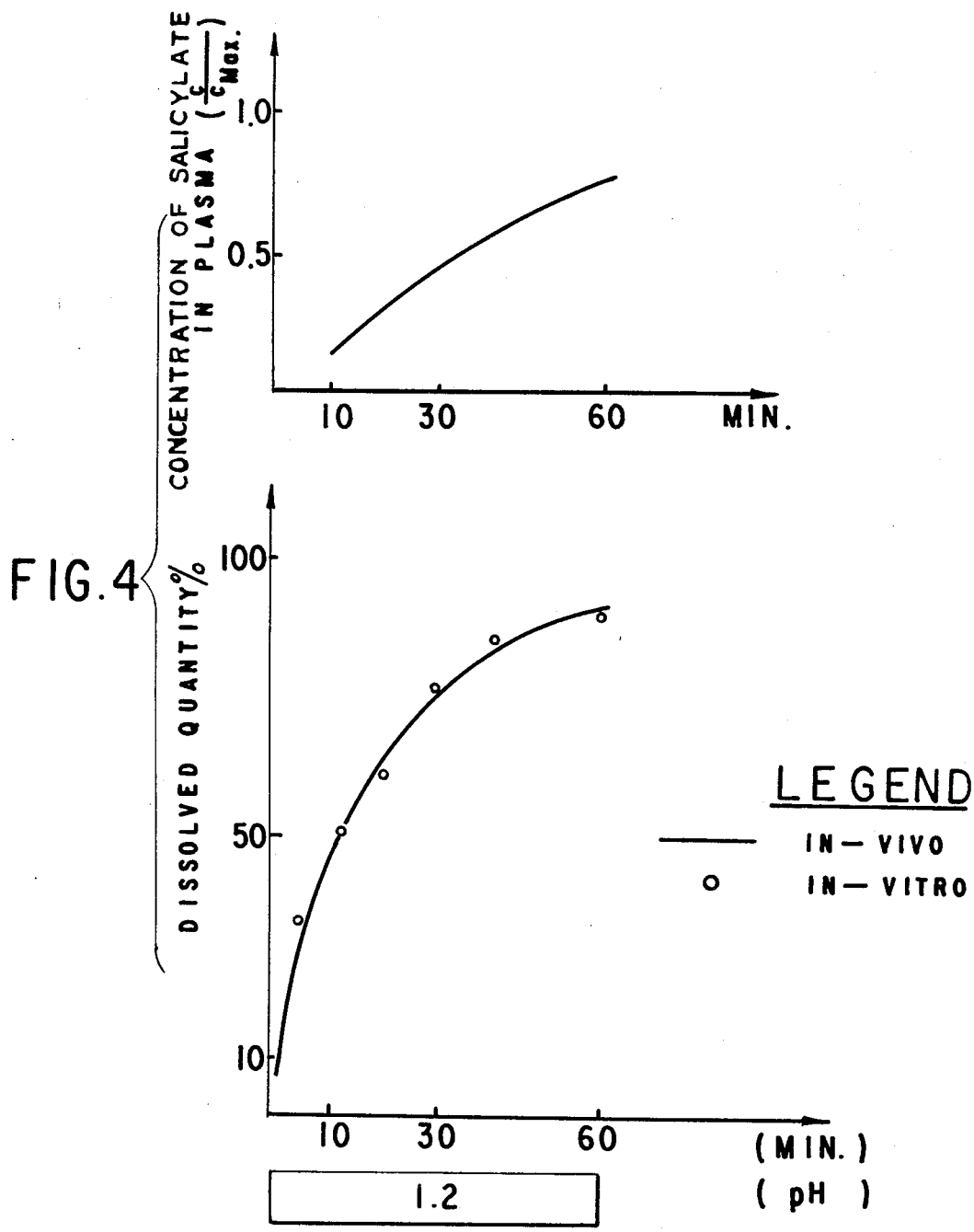

The following example and FIGS. 3, 4 and 5 of the attached drawings further illustrate the present invention and show the close correlation between the results obtained from in vitro tests using the apparatus and process of the instant invention and the results obtained from in vivo tests.

EXAMPLE

Dissolution characteristics of acetylsalicylic acid tablets

Aspirin tablets were prepared by intimately admixing 300 parts by weight of acetylsalicylic acid of varying crystalline particle size and 50 parts by weight of potato starch, and compressing the mixture into 350 mgm.-tablets with a conventional tablet-making machine. The tablets were then tested for their dissolution characteristics in the apparatus of the present invention in the manner described above.

(1) Active ingredient in fine crystalline form (see FIG. 3).—For this test, crystalline acetylsalicylic acid with a particle size smaller than 150µ was used. The tablets disintegrated in the USP-disintegration-tester within 18 seconds; half of the dose was dissolved after about five minutes; and half of the maximum concentration level in the plasma was reached after about ten minutes. The solid curve in the lower diagram of FIG. 3 represents the pharmacokinetically calculated in vivo dissolution characteristics, and the circles represent the values obtained from the in vitro test, using the apparatus described herein.

(2) Active ingredient in medium size crystalline form (see FIG. 4).—For this test, crystalline acetylsalicylic acid with a particle size of 340–450µ was used. This tablet also disintegrated within 18 seconds; one-half of the dose of active ingredient, however, did not dissolve until after 12 minutes; and half of the maximum concentration level in the plasma was reached a little later than with the tablet under (1) above (after approximately 35 minutes versus 10 minutes).

(3) Active ingredient in coarse crystalline form (see FIG. 5).—This tablet differed from the two preceding ones merely in that relatively coarse crystalline acetylsalicylic acid with a particle size of more than 800µ was used. Even though the disintegration time of this tablet was unchanged (18 seconds), half of the dose did not dissolve until after about 20 minutes, and half of the maximum concentration level in the plasma was reached after 44 minutes (compared to 10 and 33 minutes, respectively, in the case of the two preceding tablets with more finely crystallized acetylsalicylic acid).

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

I claim:

1. An apparatus for in vitro determination of the dissolution behavior of pharmacodynamic agents in the gastrointestinal tract, consisting essentially of a thermostatically controlled, cylindrical container mounted for horizontal rotation about its cylindrical axis, said container being filled to about 50% of its volume with solid spheres having the hardness and density of glass; an opening in one end of said container, said opening being closed by a hollow stopper; two thermostatically controlled supply containers for storage of artificial stomach and intestinal fluid, respectively, connected to said cylindrical container through a common intake conduit; a metering means and a fraction collector connected in series to a discharge conduit attached to said cylindrical container; and a time sequence control means with two timing clocks connected to said metering means and fraction collector for actuating the same at predetermined time intervals.

2. An apparatus according to claim 1, which additionally comprises a filtration system inserted in each of said intake and discharge conduits.

3. An apparatus according to claim 1, which additionally comprises two stop-cocks and a one-way valve in said intake conduit for regulating the flow of fluids from said supply containers therethrough.

4. The process of determining the dissolution behavior of pharmacodynamic agents in the gastrointestinal tract which comprises
  (a) charging a thermostatically controlled, cylindrical container approximately 50% filled with solid spheres with the density and hardness of glass and capable of horizontal rotation about its cylindrical axis and connected in series by a discharge outlet to a metering means and a fraction collector which are actuated by a time sequence control means with an artificial stomach fluid;
  (b) rotating the said container at 0.6 to 1.2 r.p.m. for approximately 1 hour and then neutralizing the stomach fluid;
  (c) adding artificial intestinal fluid;
  (d) charging into said cylindrical container the pharmaceutical composition whose dissolution behavior is to be determined as well as artificial stomach fluid in a volumetric ratio of about 45:55 in relation to the volume of said spheres;
  (e) thermostatically maintaining the temperature of the cylindrical container at 37° C. and rotating said cylindrical container about its horizontal cylindrical axis at about 0.6 to 1.2 r.p.m.;
  (f) actuating the metering means by means of the time sequence control means, set for $t_2$ = about 0.3 minutes and according to the equation $$t_1 = \frac{V_D}{V_s \cdot K_I} - t_2$$

wherein $t_1$ and $t_2$ are the time intervals in minutes of the two control clocks of the time sequence control means, $V_D$ is the metering volume of the metering means, $V_s$ is the volume of the liquid phase in the cylindrical container in ml., and $K_I$ is the absorption rate constant of the pharmacodynamic agent to be tested referred to the in vivo locus of absorption, to withdraw from the cylindrical container at time intervals $t_1$ and $t_2$ samples of liquid;
  (g) collecting the withdrawn samples in the fraction collector, determining the concentration of the pharmacodynamic agent in said samples, and determining the rate of dissolution of the pharmacodynamic agent in the gastrointestinal fluids pursuant to the equation $$A_x = V_s \cdot C_x + V_D \cdot \sum_{i=1}^{i=x-1} C_i$$

wherein
$A_x$ represents the dissolved quantity of pharmacodynamic agent at the time of the $x$th metering of a sample (in mgm.)
$V_s$ is the volume of the liquid phase in the cylindrical container (in ml.)
$C_x$ is the measured concentration of the pharmacodynamic agent in the $x$th sample, and
$V_D$ is the metering volume of the metering means.

References Cited

UNITED STATES PATENTS 3,545,864   12/1970   Dibbern _____ 23—253 X

OTHER REFERENCES

H. Stricker: Die Pharmazeutische Industrie, vol. 31, No. 11, pp. 794–799 (1969).

JOSEPH SCOVRONEK, Primary Examiner

U.S. Cl. X.R.

23—253 R, 259, 267 R; 424—2, 9